United States Patent [19]

Bichot et al.

[11] Patent Number: 4,879,444
[45] Date of Patent: Nov. 7, 1989

[54] APPARATUS FOR THE HEAT TREATMENT OF INSULATING MATERIALS USING MICROWAVE ENERGY AND HOT GAS

[75] Inventors: Bernard Bichot, Clermont; Bernard Louis, Liancourt, both of France

[73] Assignee: Isover Saint-Gobain, Courbevoie, France

[21] Appl. No.: 210,084

[22] Filed: Aug. 4, 1988

Related U.S. Application Data

[60] Division of Ser. No. 173,043, Mar. 28, 1988, which is a continuation of Ser. No. 943,827, Dec. 17, 1986, abandoned, which is a continuation of Ser. No. 628,266, Jul. 6, 1984, abandoned.

[30] Foreign Application Priority Data

Jul. 8, 1983 [FR] France ................................ 8311401

[51] Int. Cl.$^4$ .............................................. H05B 6/78
[52] U.S. Cl. .................... 219/10.55 A; 219/10.55 F; 219/10.55 R; 156/379.9; 156/380.9; 34/1
[58] Field of Search ................ 219/10.55 A, 10.55 R, 219/10.55 F, 10.55 D, 10.55 E, 10.69, 10.81, 10.71, 400; 34/1, 4; 156/272.2, 379.9, 380.9, 379.6, 379.8, 380.2

[56] References Cited

U.S. PATENT DOCUMENTS

| | | | |
|---|---|---|---|
| 2,871,911 | 2/1959 | Goldsworthy et al. | 156/379.8 |
| 3,096,161 | 7/1963 | Morrison et al. | 34/1 |
| 3,277,580 | 10/1966 | Tooby | 34/1 |
| 3,699,899 | 10/1972 | Schiffmann et al. | 219/10.55 A |
| 3,723,212 | 3/1973 | Casper | 156/272.2 |
| 3,737,608 | 6/1973 | Nagao et al. | 219/10.55 R |
| 3,738,886 | 6/1973 | Southgate | 156/272.2 |
| 3,864,183 | 2/1975 | Hori | 156/379.9 |
| 3,881,403 | 5/1975 | Ingram et al. | 219/10.55 AX |
| 4,018,642 | 4/1977 | Pike et al. | 156/272.2 |
| 4,405,850 | 9/1983 | Edgar | 219/10.55 A |
| 4,456,498 | 6/1984 | Churchland | 219/10.55 A |
| 4,468,865 | 9/1984 | Inagaki | 34/1 |
| 4,687,895 | 8/1987 | Chitre et al. | 219/10.55 A |

FOREIGN PATENT DOCUMENTS

| | | |
|---|---|---|
| 1560817 | 7/1965 | Fed. Rep. of Germany . |
| 2612927 | 3/1976 | Fed. Rep. of Germany . |
| 939351 | 11/1948 | France . |
| 2103239 | 4/1972 | France . |
| 0049194 | 4/1982 | France . |
| 2501450 | 9/1982 | France . |
| 2019543 | 10/1979 | United Kingdom . |

Primary Examiner—Philip H. Leung
Attorney, Agent, or Firm—Oblon, Spivak, McClelland, Maier & Neustadt

[57] ABSTRACT

For heat treating products having a substantially circular cross section and being composed of mineral fibers containing a binder in solution in water, a metal container impervious to microwaves and equipped with a conveyor device includes a source of hot gas which is directed to the surface of the product. The conveyor in the form of a movable belt and a ceiling of fixed plates cooperate to roll the products during transport through the container so that their displacement is half of the speed of the belt.

8 Claims, 1 Drawing Sheet

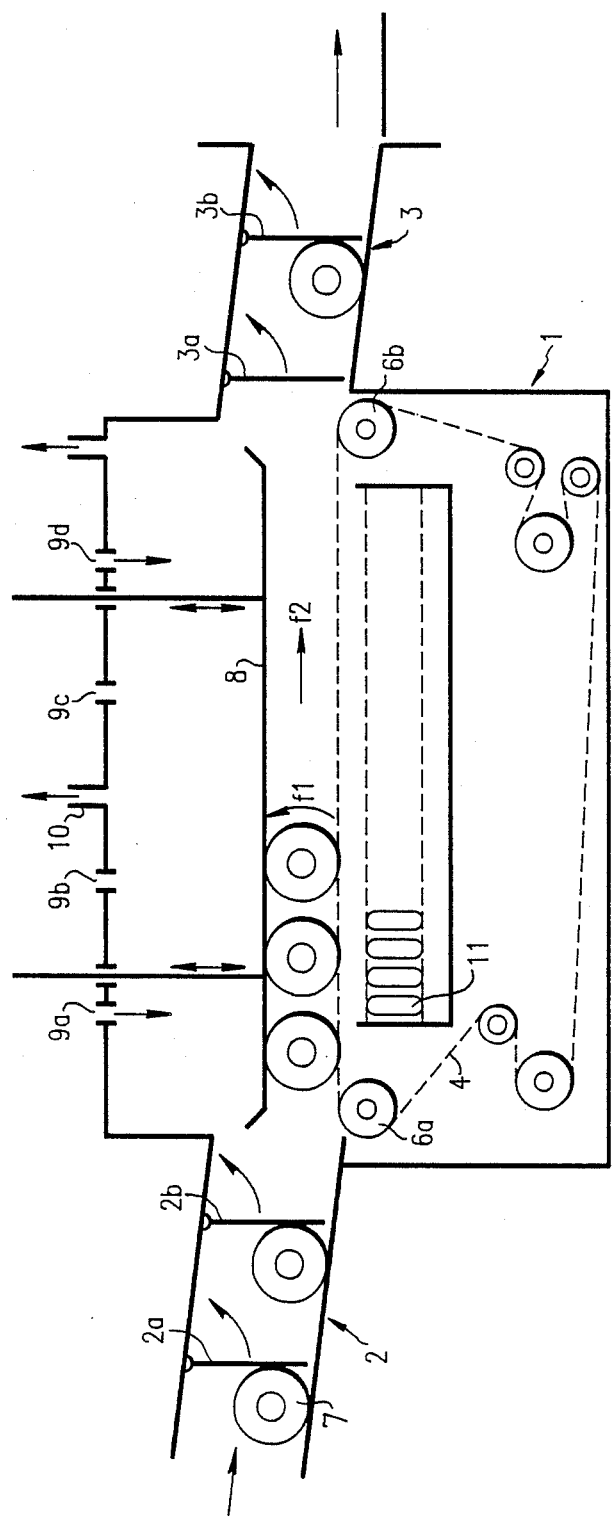

APPARATUS FOR THE HEAT TREATMENT OF INSULATING MATERIALS USING MICROWAVE ENERGY AND HOT GAS

This is a division of application Ser. No. 07/173,043, filed Mar. 28, 1988, which is a continuation of application Ser. No. 06/943,827, filed Dec. 17, 1986, now abandoned, which is a continuation of application Ser. No. 06/628,266, filed July 6, 1984, now abandoned.

BACKGROUND OF THE INVENTION

1. Field of the Invention:

The present invention relates to the heat treatment of products comprising a thermally insulating material, particularly with a view to bringing about polymerisation and/or polycondensation reactions of certain components within the substance of the product.

It relates to a process and apparatus for heating by dielectric loss under ultra-high frequency radiation, particularly suitable for application to the treatment of felts or products based on mineral fiber felts, in particular in the form of shaped pieces such as insulating shells.

2. Background of the Prior Art:

It is known that insulating shells are conventionally manufactured by winding a certain number of superimposed layers of a mat of mineral fibers impregnated with a thermosetting resin around a mandrel, the definitive form of the object being fixed by a heat treatment.

The heal treatment hitherto carried out generally consists of applying a blast of hot air from the interior of the shell if the shell has a large diameter or from the outside in the case of a shell of small diameter, the shell being in that case heated by conduction from the outside to the inside. Such a method of treatment has been described, for example, in French Patent FR-A-2 325 007.

This technique usually has the disadvantage of being relatively expensive in energy consumption and slow since it requires the previous removal of residual water left in the material from various preliminary operations such as the formation and impregnation of the fibrous mat.

SUMMARY OF THE INVENTION

The present invention uses to advantage what constitutes a handicap for the conventional process, namely the presence of a significant quantity of water within the whole volume of the objects to be treated, this water being used for heating by dielectric loss under ultra-high frequency radiation.

The present invention has as its object an apparatus for the heat treatment of a material based on mineral fibres and containing a binder capable of hardening under the effect of polymerisation and/or polycondensation reactions, according to which the said binder is provided in the form of an aqueous solution and the said material is subjected to a field of ultra-high frequency radiation, the water content of the said material and the intensity of the field of radiation being adjusted to suitable levels to enable the material to be heated at least to the minimum temperature required for releasing the said reactions in the interior of the material, a gas current heated at least to the said minimum temperature being directed on to the surface of the said material.

The apparatus according to the present invention for the treatment of products based on mineral fibers containing a binder in solution in water, and having a substantially cylindrical cross section, includes a metal container impervious to microwave and equipped with a conveyor device for conveying the products through the container, at least one source of ultra high frequency radiation directed towards the product and a source of hot gas which is directed to the surface of the product. The conveyor device comprises, for the purpose of the treatment of objects having a substantially circular cross section, means for rolling the objects, substantially without sliding, about a non-zero axis with respect to the direction of the microwaves. The conveyor device and the means for rolling comprise, in combination, a moving belt and a ceiling of fixed plates, between which and in contact with which are situated the objects, the displacement of the belt causing the displacement of the objects at half the speed of the belt and causing the rolling thereof.

BRIEF DESCRIPTION OF THE DRAWINGS

FIG. 1 is a schematic representation of the apparatus of the invention taken in longitudinal crosssection.

DETAILED DESCRIPTION OF THE INVENTION

It is believed that this technique at present constitutes the only means applicable to a material which is electrically non-conductive and thermally insulating for achieving a homogeneous treatment throughout its volume inasmuch as such a material has a significant dielectric loss factor, especially if it contains substances including polar molecules, since the vibration of the dipoles under the action of an alternating electric field of high frequency causes heating of the substance and hence of the material itself.

Since water in liquid form is one of the most widely available polar substances, it is well known to apply the technique of heating by dielectric loss to materials containing water.

Numerous apparatus employ heating by dielectric loss for drying materials such as wood (Patents FR-A-2 000 992, 2 147 456), textile fibers in the form of twisted cords, bobbins or skeins (Patents FR-A-2 103 239, 2 299 443, 2 423 948), certain ceramic pastes (Patents FR-A-2 076 405, 2 100 539), etc. These apparatus generally combine heating by dielectric loss with heating by a blast of hot air, the former having the disadvantage of only heating the surface of the object to a temperature significantly below that of the interior since the power dissipated by these means decreases with the water content.

Some of these apparatus are aimed at avoiding certain disadvantages resulting from the reflection of the ultra-high frequency radiation against the metal surfaces of the container in which the treatment is carried out, in particular the phenomena of interference between the incident waves and the reflected waves, which results in unevenness of the temperature within the material treated and hence unevenness of the treatment itself. For this purpose, these apparatus employ devices known as wave mixers.

Within the range of ultra-high frequency radiation or microwaves covering frequencies from 300 MHz to 30 GHz, corresponding to wavelengths of the order of a meter and a centimeter, respectively the frequency band centered on 2450 MHz, corresponding to a wavelength of approximately 12 cm, is generally preferred for industrial application.

The highest frequencies have insufficient penetration in most materials and the weakest cause an increase in the electric field for a given energy power dissipated, and consequently entail the risk of electric arc discharge or "breakdown". The average range which is preferred, only requires tensions of the order of a few kv.

The insulating shells, for the treatment of which, for example, the present invention proposes to employ heating by microwaves, are generally impregnated in depth with an aqueous solution of thermosetting resins such as phenol formaldehyde resins of the resol type in the course of their manufacture by the conventional process, and when the shell has been shaped, the dimensions are generally stabilized by a heat treatment which removes the water contained in the shell, followed by reactions of polymerisation and polycondensation. To achieve treatment times of the order of a minute, compatible with industrial processes, release of these reactions normally requires temperatures of the order of 150 C. to 200 C., that is to say, well above the boiling point of water.

A process of heating by microwaves would not at first sight appear to be capable of achieving the above mentioned temperatures since the resins which are to undergo these reactions as well as the mineral fibers have only low dielectric loss factors and have therefore little capability on their own of being heated by microwaves and since water, which is the only constituent present in the said shells to have a high loss factor, would be assumed to fix the upper limit of temperature attainable to 100 C; this technique would therefore not appear to be capable of providing a solution to the problem under consideration.

Tests have shown, however, that contrary to what was to be expected, it is not necessary to introduce additional polar substances into the shells which are to be treated by microwaves, provided the shells have a sufficient water content per unit volume of product and the power brought into play per unit volume reaches a minimum level.

The water content of the material based on mineral fibers having a density of from 30 to 150 kg/m$^3$ will generally be adjusted to a value of from 0.7 to 5 kg/m$^3$, preferably from 1 to 3 kg/m$^3$, the binder content of the material being from 1 to 20% by mass.

In one embodiment of the process applicable to separate objects made of similar material, the objects are subjected to a displacement in the field of radiation. For a simple method of treating a batch of objects, the objects are moved preferably in a plane perpendicular to the direction of propagation of the microwaves and advantageously also rotated by rolling, each about itself, preferably about an axis set at an angle other than zero to the direction of propagation of the rays, preferably 90°, with a view to achieving homogeneity.

For such materials, the microwave energy applied to the product will generally amount to at least 0.1 kWh/kg of product while the power directed on the product is preferably at least 2 kW/kg of product for an overall water content of about 2%.

In addition, heating power amounting to between $\frac{1}{4}$ and $\frac{1}{2}$ of the power of the microwaves injected is supplied in this process in the form of hot, dry gas.

It may be noted by way of indication that under these conditions, the total energy consumption, assuming that the production of microwave energy provides a yield of about $\frac{1}{2}$, is of the order of 0.2 kWh/kg for a product having a water content of 2%, which means that the energy consumption is about 5 times less than that required when heating is provided by hot air alone.

The invention relates to an apparatus for the heat treatment of a product based on mineral fibers containing a binder applied in the form of an aqueous solution and capable of being hardened by a polymerisation and/or polycondensation reaction, comprising a metal container impervious to microwaves and equipped with a conveyor device, at least one source of ultra-high frequency radiation directed to the said product and a source of hot gas connected to means for directing the said gas to the surface of the product, the power provided by the said gas representing $\frac{1}{4}$ to $\frac{1}{2}$ of the power from the microwaves. If the product to be treated is in the form of separate objects, the conveyor device for the said objects preferably comprises means for rotating the objects about themselves on an axis set at an angle other than zero to the direction of the microwaves, preferably an angle of 90°.

According to one preferred embodiment of the treatment of objects in the form of a cylinder of revolution, the conveyor device for the objects and the means for rotation together constitute a supporting table, which is optionally displaceable and is permeable to microwaves, and pushing devices such as fingers or rods which act to roll the cylindrical objects on the support.

According to one variation providing the same effect, the means for transferring and rotating the objects consist of a combination of a conveyor belt and a roof or fixed plates, between which and in contact with which are situated the objects, displacement of the conveyor belt causing displacement of the objects at half the speed of the belt and their rolling rotation without sliding.

The apparatus advantageously comprises a plurality of microwave generators, each preferably controlled by a detector for detecting the presence of objects in the zone covered by it so as to prevent operation of the generator when the zone is empty.

The installed microwave power for frequencies of the band of 2450 MHz is preferably such that the product receives at least two kW microwaves per kg of product when the overall water content is about 2%.

An embodiment of the apparatus according to the invention will now be described by way of non-limiting example to illustrate its characteristics and advantages with reference to FIG. 1.

This apparatus comprises a metal container 1 having an inlet lock chamber 2 and an outlet lock chamber 3 each equipped with pivoting flaps 2a, 2b, 3a, 3b, respectively, to ensure imperviousness to the microwaves.

A conveyor belt 4 consisting of a silicone treated glass fiber fabric defines by means of drums 6a and 6b the path along which the shells 7 are driven through the container 1.

Two presser plates 8 exert light pressure on the shells 7, causing them to revolve about i.e., roll, themselves in the direction of the arrow f$_1$ while the conveyor belt 4 travels in the direction of the arrow f$_2$.

Additional hot air is injected into the container through orifices 9a, 9b, ... which may advantageously be extended into ducts (not shown) to the level of the shells travelling on the belt 4.

Orifices 10 connected to an antipollution apparatus (not shown) are provided for the treatment of the effluent gas. This apparatus may be considerably less powerful and less expensive than any required for traditional processes employing hot gas.

Microwave generators 11 disposed below the belt 4 and emitting in a range centered on 2450 MHz have their rectangular emission orifices directed on the belt 4. Each of the generators is controlled by a detector (not shown) for detecting the presence of shells. For example, for a stove treating 300 kg per hour of shells having an overall water content of 2%, there are provided 6 groups of 6 generators having a unit microwave power of 1 kW, producing a grid or chequerboard layout of 36 bundles of microwaves directed towards the belt 4.

What is claimed as new and desired to be secured by letters patent of the United States is:

1. Apparatus for the heat treatment of products based on mineral fibres containing a binder in solution in water, capable of being hardened by reactions of polymerisation and/or polycondensation, comprising:
   a metal container impervious to microwaves and equipped with a conveyor device for conveying the products through said container, said products comprising discrete objects having a substantially circular cross section;
   at least one source of ultra-high frequency microwave radiation directed in a direction towards the objects;
   a source of hot gas which gas is directed to the surface of the objects, the conveyor device comprising, means for rolling said objects substantially without sliding about an axis forming an angle other than zero with the direction of the microwaves,
   wherein the conveyor device and means for rolling comprise, in combination, a movable belt and a ceiling of fixed plates, between which, and in contact with which, may be situated the objects, the displacement of the belt causing the displacement of the objects at half the speed of the belt and causing the rolling thereof.

2. The apparatus of claim 1, wherein said angle is 90°.

3. Apparatus according to claim 1, wherein the power provided by said gas is from $\frac{1}{4}$ to $\frac{1}{2}$ of the microwave power.

4. Apparatus according to one of the claim 1, wherein said at least one radiation source comprises a plurality of microwave generators each corresponding to a radiation zone, each controlled by a detector for detecting the presence of material to be treated in the zone which it covers.

5. Apparatus according to claim 1, wherein said radiation source has a power of at least 2 kW microwaves per kg of product having a water content of 2%.

6. The apparatus according to claim 1, including an inlet lock chamber connected to said container at one end of said movable belt and an outlet lock chamber connected to said container at another end of said movable belt.

7. Apparatus according to claim 6 including pivoting flaps in said inlet and outlet lock chambers.

8. Apparatus according to claim 1, wherein said at least one radiation source comprises a plurality of microwave generators located beneath said movable belt.

* * * * *